(12) United States Patent
Matsushita (10) Patent No.: US 7,499,672 B2
(45) Date of Patent: *Mar. 3, 2009

(54) WIRELESS COMMUNICATION SYSTEM

(75) Inventor: Naohiro Matsushita, Mishima (JP)

(73) Assignee: Toshiba Tec Kabushiki Kaisha (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/974,889

(22) Filed: Oct. 16, 2007

(65) Prior Publication Data

US 2008/0049858 A1  Feb. 28, 2008

Related U.S. Application Data

(60) Division of application No. 10/798,947, filed on Mar. 11, 2004, now Pat. No. 7,302,228, which is a continuation of application No. PCT/JP03/07938, filed on Jun. 23, 2003.

(30) Foreign Application Priority Data

| Jun. 25, 2002 | (JP) | ............................. 2002-184564 |
| Aug. 23, 2002 | (JP) | ............................. 2002-244092 |
| Oct. 28, 2002 | (JP) | ............................. 2002-312867 |

(51) Int. Cl.
H04B 7/00 (2006.01)

(52) U.S. Cl. ..................... 455/41.2; 375/260; 455/41.1

(58) Field of Classification Search ............... 455/41.2, 455/41.1, 41.3, 562.1; 375/141, 215, 260, 375/304; 343/770, 771; 379/55.1
See application file for complete search history.

(56) References Cited

U.S. PATENT DOCUMENTS

| 4,866,732 A | 9/1989 | Carey et al. |
| 5,157,393 A | 10/1992 | Fox et al. |
| 5,586,167 A | 12/1996 | Handforth |
| 5,689,804 A | 11/1997 | Sugita et al. |
| 7,302,228 B2 * | 11/2007 | Matsushita ................. 455/41.2 |
| 2001/0006903 A1 | 7/2001 | Park |

FOREIGN PATENT DOCUMENTS

| EP | 0 630 070 | 5/1994 |
| EP | 0 804 006 | 10/1997 |
| GB | 2 208 778 | 4/1985 |
| GB | 2208778 | 12/1989 |
| JP | 62-200924 | 9/1987 |

(Continued)

OTHER PUBLICATIONS

Communication (with translation) from Korean Patent Office re: related application.

(Continued)

*Primary Examiner*—Quochien B Vuong
(74) *Attorney, Agent, or Firm*—Harness, Dickey & Pierce, P.L.C.

(57) ABSTRACT

A leaky coaxial cable is arranged to meander on a ceiling of an indoor space where a wireless LAN is to be worked. One end of the leaky coaxial cable is connected to a wireless base station unit and the other end thereof is connected to a terminator. The wireless base station unit makes wireless communication with a wireless terminal unit through the leaky coaxial cable by modulation and demodulation in orthogonal frequency division multiplex modulation (OFDM).

4 Claims, 6 Drawing Sheets

FOREIGN PATENT DOCUMENTS

| | | |
|---|---|---|
| JP | 63-290416 | 11/1988 |
| JP | 3-289838 | 12/1991 |
| JP | 04-113727 | 4/1992 |
| JP | 5-48502 A | 2/1993 |
| JP | 6-188821 A | 7/1994 |
| JP | 7-263937 | 10/1995 |
| JP | 8-274702 | 10/1996 |
| JP | 9-217463 A | 8/1997 |
| JP | 10-70554 A | 3/1998 |
| JP | 10-105878 | 4/1998 |
| JP | 10-294683 | 11/1998 |
| JP | 11-248827 | 9/1999 |
| JP | 11-261478 | 9/1999 |
| JP | 2000-287798 | 10/2000 |
| JP | 2001-28576 A | 1/2001 |
| JP | 2001-251270 | 9/2001 |

OTHER PUBLICATIONS

Communication (with translation) from Japanese Patent Office re: related application.

Fujii, et al, Takeo; Indoor Multi Base Station System with Simultaneous Transmission Using OFDM Adaptive Array Antenna; KEIO University, vol. 2, Sep. 18, 2000; pp. 1241-1245.

Communication from European Patent Office re: related application.

International Search Report—PCT/JP03/07938; ISA/JPO; Mailed Oct. 14, 2003.

Fujii, Takeo, "Indoor Multi Base Station System With Simultaneous Transmission Using OFDM Adaptive Array Antenna", Department of Electrical Engineering, Keio University, pp. 1241-1245, Sep. 2000.

Communication mailed Oct. 14, 2008 from European Patent Office re related application.

* cited by examiner

WIRELESS COMMUNICATION SYSTEM

CROSS-REFERENCE TO RELATED APPLICATIONS

This is a divisional application of U.S. Ser. No. 10/798,947, filed Mar. 11, 2004 which is a continuation application of PCT/JP03/07938, filed Jun. 23, 2003 that claims priority to Japanese Patent Application Nos. 2002-184564 filed Jun. 25, 2002; No. 2002-244092, filed Aug. 23, 2002; and No. 2002-312867, filed Oct. 28, 2002, all of which are incorporated herein by reference.

BACKGROUND OF THE INVENTION

1. Field of the Invention

This invention relates to a wireless communication system making indoor wireless communication between a wireless base station unit and a wireless terminal unit.

2. Description of the Related Art

Figure 14:
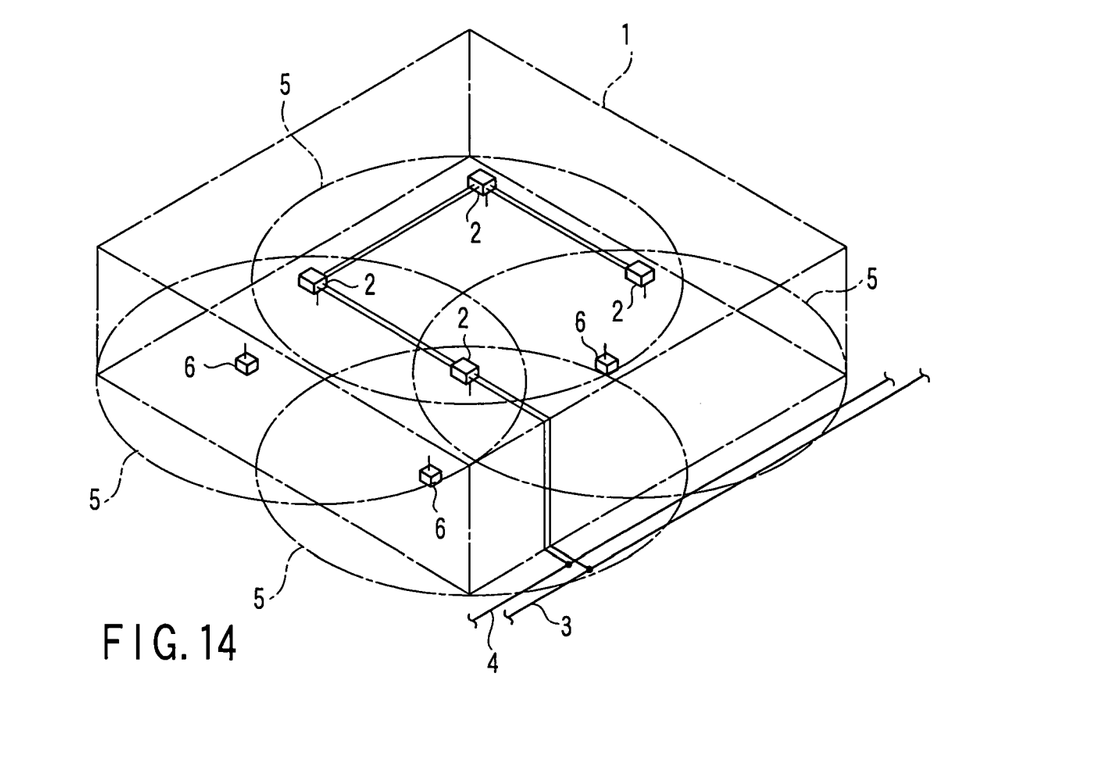
FIG. 14 is a perspective view showing the prior art.

A wireless communication system making indoor wireless communication between a wireless base station unit and a wireless terminal unit in an indoor space as shown in FIG. 14 has been known. A plurality of wireless base station units 2 are arranged on a ceiling of an indoor space 1 where a wireless LAN is to be worked, and a LAN cable 3 and a power supply cable 4 are connected to the wireless base station units 2 from the outside.

Each of the wireless base station units 2 makes wireless communication with a wireless terminal unit 6 located in a cell 5 which is regarded as a wireless communication range. For this reason, the cells 5 need to be arranged to cover an entire floor surface of the indoor space 1. The wireless base station units 2 are arranged such that the cell overlaps the others to some extent in view of safety. For example, a radius of the cell 5 on the floor formed by the wireless base station unit 2 is set at approximately 20 m. Therefore, if the floor surface is 50 m square, at least four wireless base station units 2 need to be arranged.

In addition, a wireless communication system disclosed in Jpn. Pat. Appln. KOKAI Publication No. 06-188821 is also known. In this system, a base station comprises antenna transmitting and receiving means for making wireless communication with a terminal station located in a service area and coaxial cable transmitting and receiving means having a comparatively large output to make wireless communication with a terminal station having a blind area that a radio wave irradiated from the base station does not reach effectively. Inside the blind area, an antenna or a leaky coaxial cable is arranged in accordance with the shape of the blind area. The antenna or leaky coaxial cable and the feeder transmitting and receiving means of the base station are connected to each other by a feeder having a predetermined attenuation constant and a predetermined length. An output level of the radio wave irradiated from the antenna or leaky coaxial cable is therefore set not to exceed a level of the radio wave from the antenna transmitting and receiving means of the base station.

In a cell division scheme such as the former case, however, more wireless base station units need to be arranged to remove the blind areas caused by furniture and fixtures, in the indoor environment where there are a number of furniture and fixtures as disturbances of the radio wave propagation. For this reason, the total number of employed wireless base station units is increased, the number of installation works of the wireless base station units is increased in accordance with the increased number thereof, and the entire installation costs are increased.

Moreover, if the number of arranged wireless base station units is increased, incoming waves from the wireless base station units cause interference that carrier waves erase each other, at the receiving antenna. For this reason, no effect can be obtained even if a modulation and demodulation scheme resistant to the multipath interference such as the orthogonal frequency division multiplex modulation (hereinafter referred to as OFDM) scheme is applied. Therefore, a problem arises that even if all the wireless base station units simultaneously emit the radio waves, broadcast transmission cannot be executed for all the wireless terminal units. In addition, transmission can be executed to the wireless base station units one after one by time division. In this case, however, much time is spent to complete the entire information transmission.

In the latter scheme, leaky coaxial cables are further arranged in the blind area besides the wireless LAN system including general base stations, and wireless installations serving as the feeder transmitting and receiving means exclusive for the leaky coaxial cables. For this reason, the system becomes large in size and the total installation costs are increased.

The object of the present invention is to provide a wireless communication system which can prevent generation of the indoor blind areas, and which can implement high-speed broadcast transmission causing no intersymbol interference at small costs.

BRIEF SUMMARY OF THE INVENTION

The wireless communication system of the present invention is provided indoors. The system comprises a transmission path provided indoors to function as an antenna, a wireless terminal unit arranged indoors and a wireless base station unit which makes wireless communication with the wireless terminal unit via the transmission path. The wireless communication between the wireless terminal unit and the wireless base station unit is made in the OFDM modulation scheme.

In other words, the wireless communication system of the present invention can prevent generation of the indoor blind areas, and can implement high-speed broadcast transmission causing no intersymbol interference at small costs.

BRIEF DESCRIPTION OF THE SEVERAL VIEWS OF THE DRAWING

FIG. 11 is an illustration showing a structure of an antenna array cable according to a fourth embodiment of the present invention;

FIG. 12B is an illustration showing a structure of a second antenna portion of the antenna array cable according to the fourth embodiment;

FIGS. 13A and 13B show illustrations showing radio wave radiation patterns of the antenna array cable according to the fourth embodiment.

DETAILED DESCRIPTION OF THE INVENTION

Embodiments of the present invention will be described below with reference to the drawings.

FIRST EMBODIMENT

Figure 1:
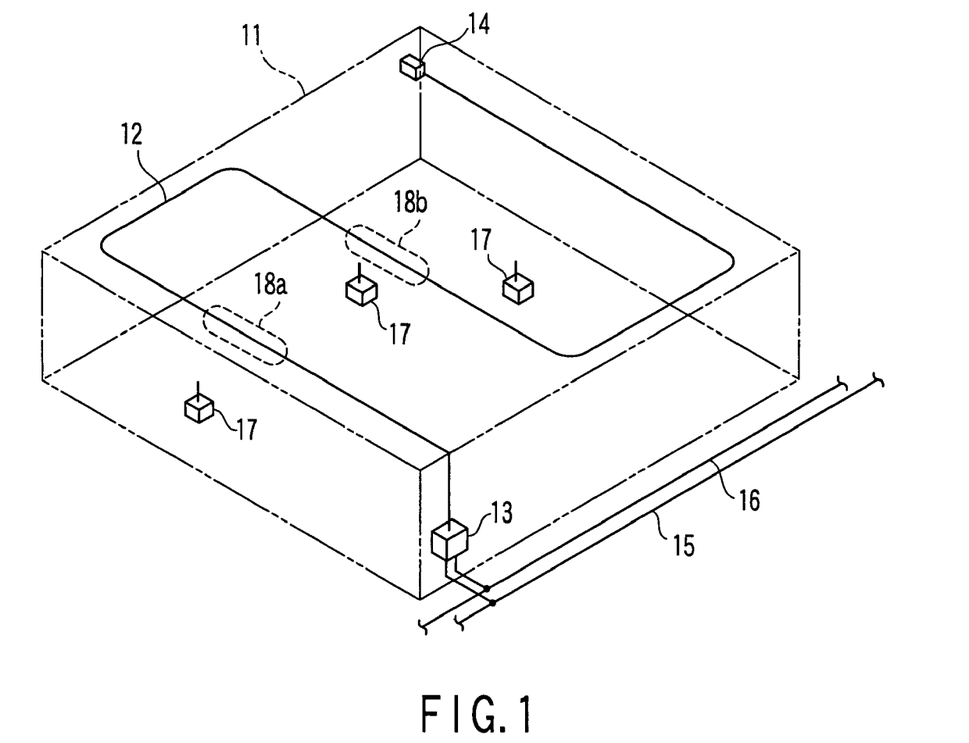
FIG. 1 is a perspective view showing arrangement of units according to a first embodiment of the present invention.

As shown in FIG. 1, a leaky coaxial cable 12 which is a kind of a leaky transmission path is arranged to meander on a ceiling of an indoor space of shops and stores or the like, for example, an indoor space 11 where a wireless LAN is to be worked. The leaky coaxial cable 12 is a transmission path which functions as an antenna.

The leaky coaxial cable 12 is arranged on, for example, a topside or underside of ceiling panels. If there are no ceiling panels, the leaky coaxial cable 12 is hung inside a roof and is arranged in an upper space portion of the indoor space 11.

A leaky waveguide can also be used other than the leaky coaxial cable as the leaky transmission path. The leaky waveguide having a smaller transmission loss is suitable to a low transmission power system such as the wireless LAN.

Figure 2A:
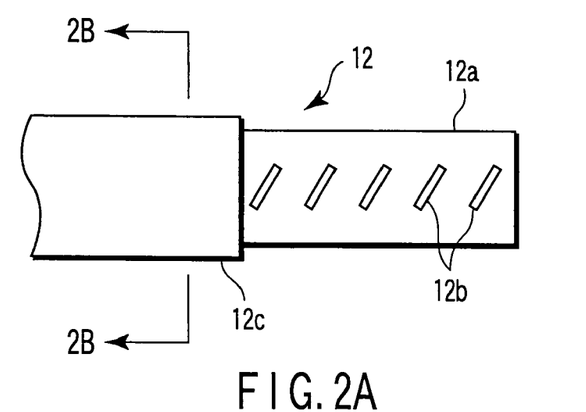
FIG. 2A is an illustration showing a structure of a leaky coaxial cable according to the first embodiment.
Figure 2B:
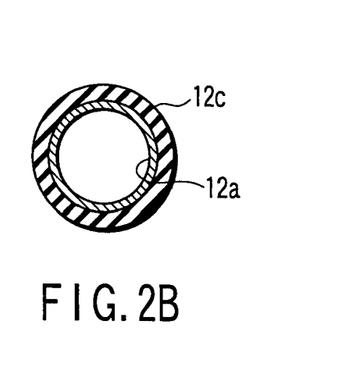
FIG. 2B is a cross-sectional view of the leaky coaxial cable shown in FIG. 2A.

In the leaky coaxial cable 12, slots 12b having a predetermined length are spaced with a constant interval on an entire body of a tubular conductor 12a as shown in FIGS. 2A and 2B. The slots 12b are covered by a coating member 12c. In this structure, radio waves are transmitted and received between an interior of the coaxial cable 12 and an exterior space through the slots 12b.

Figure 3A:
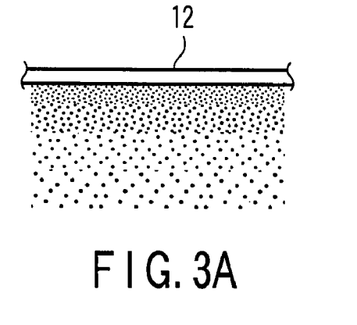
FIGS. 3A and 3B show illustrations showing radio wave radiation patterns according to the first embodiment.
Figure 3B:
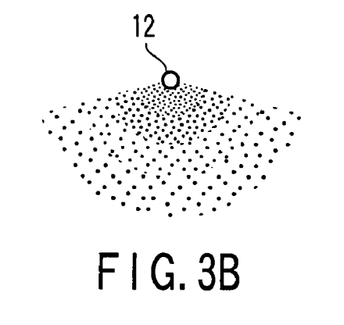
Figure 4:
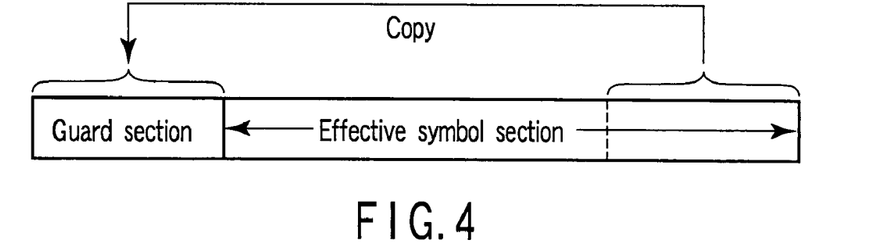
FIG. 4 is an illustration showing a structure of a modulation symbol in the OFDM scheme applied to the communication of the first embodiment.

Radio wave radiation characteristics of the leaky coaxial cable 12 shows a radiation pattern as illustrated in FIG. 3, unlike a general single-type antenna such as a whip antenna and a dipole antenna. In other words, the radiation pattern is shaped in a fan as seen from an axial direction of the leaky coaxial cable 12 and is extended along the entire body of the leaky coaxial cable 12. In a field intensity distribution which can be obtained, the field intensity is greater near the leaky coaxial cable 12 and becomes gradually smaller as it comes away from the leaky coaxial cable 12.

In a wireless LAN system of a 2.4 GHz band or a 5 GHz band having the transmission power of tens to hundreds of mW, the interval of the meandering leaky coaxial cable 12 should rationally be set at approximately 6 to 10 m, in view of compatibility between the communication performance and the economics.

One end of the leaky coaxial cable 12 is connected to a wireless base station unit 13 and the other end thereof is connected to a terminator 14 serving as a termination load having a load resistance value equivalent to the characteristic impedance of a coaxial cable. The wireless base station unit 13 is mounted on a wall surface such that a maintenance work is facilitated. The wireless base station unit 13 may be mounted on the ceiling panels or the like.

The wireless base station unit 13 is connected to a LAN cable 15 and a power supply cable 16. A plurality of wireless terminal units 17 making wireless communication with the wireless base station unit 13 are arranged on the floor of the indoor space 11.

In the wireless LAN system thus configured, information transmitted from the LAN cable 15 to the wireless base station unit 13 is modulated in the OFDM scheme and sent to the leaky coaxial cable 12 as a high frequency signal of a 2.4 GHz band or a 5 GHz band. While the high frequency signal propagates in the leaky coaxial cable 12, a part of the signal is radiated to a space toward the floor through a number of slots 12b, within an angle range of about 180 degrees, as a radio wave.

The wireless terminal units 17 strongly receive, particularly, a plurality of transmitted waves radiated from slot groups 18a and 18b located comparatively close thereto, of the slots 12b of the leaky coaxial cable 12, as the incoming waves. A large receiving power, i.e. a main power can be obtained by the strongly received incoming waves. There is a time difference between the time when the transmitted waves reach the receiving point and the time when they are received as the incoming waves. If the interval of the leaky coaxial cable 12 is 10 m, the distance of the leaky coaxial cable 12 from the floor is 3 m, and the distance between the slot groups 18a and 18b on the leaky coaxial cable 12 is 20 m, the maximum time difference of the incoming waves received by the wireless terminal units 17 is approximately 90 nsec.

According to the standards of the OFDM scheme applied to the wireless LAN, a guard section which can remove influence of a delayed wave is set at 800 nsec. The OFDM is one of the multi-carrier transmission schemes, allowing the transmission data to be transmitted by a number of sub-carriers orthogonal to each other. Each of the sub-carriers transmits a modulation symbol (multi-base code) formed of an effective symbol section and a guard section which is formed by copying a part of the effective symbol section.

Figure 5:
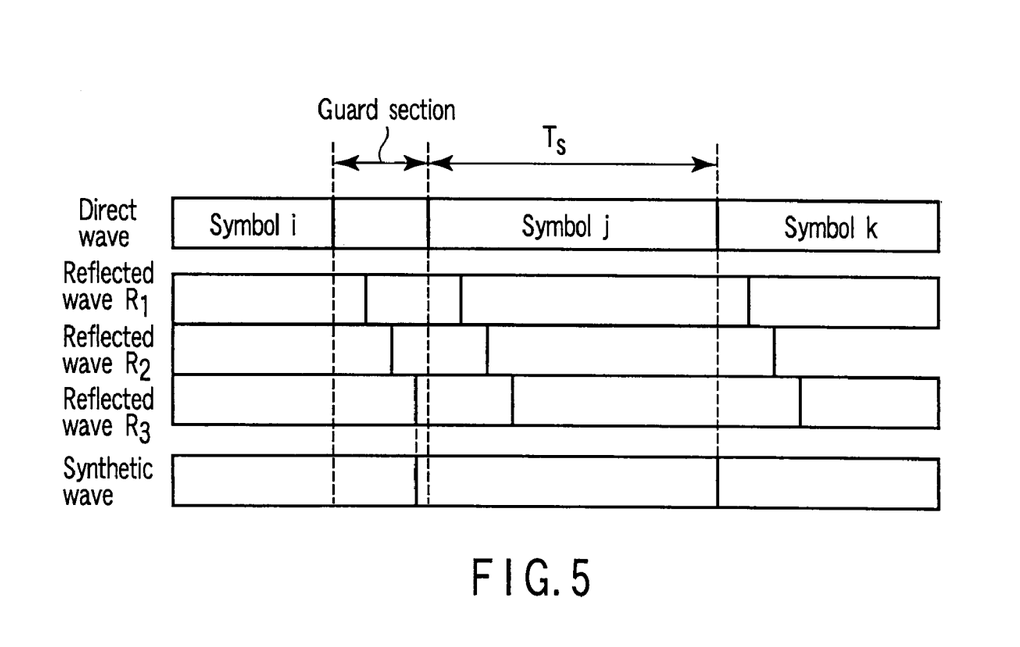
FIG. 5 is an illustration showing an effect of a guard section in the OFDM scheme applied to the communication of the first embodiment.

There are not only a direct path, but also a plurality of reflection paths between the transmission and the reception. Therefore, a plurality of symbols having a time difference, such as a direct wave and reflected waves R1, R2, and R3 are received on the receiving side as shown in FIG. 5. On the receiving side, only constituent elements of effective symbol j are included in a synthetic wave of section Ts. This means that by adding the guard section on the transmitting side, components of preceding and following symbols i and k are not included in the section Ts if the synthetic wave is a delayed wave within the time difference of the guard section. On the receiving side, the OFDM demodulation can be executed without receiving the interference of adjacent symbol sections by subjecting a portion cut out in the section Ts to the Fourier transform.

Thus, the wireless terminal units 17 can receive and process the incoming waves from the slot groups 18a and 18b in the OFDM demodulation, and can certainly obtain the information, by executing the transmission and reception of the information between the wireless base station unit 13 and the wireless terminal units 17 in the OFDM scheme. In addition, even if the transmitted wave from the slot group 18a is completely blocked by disturbances such as persons or furniture and fixtures, the transmitted wave from the slot group 18b arrives at the receiving antenna.

In other words, as the radio wave propagation path which is not influenced by the disturbances exists between the wireless terminal units 17 and any of slots 12b of the leaky coaxial cable 12, the transmitted waves from the wireless terminal units 17 certainly arrive at the leaky coaxial cable 12.

In addition, the receiving antennas of the wireless terminal units 17 receive a number of incoming waves. The incoming waves are radiated through a number of slots 12b. As the phase differences of the incoming waves are different in very small step, the incoming waves received by the receiving antennas of the wireless terminal units 17 are considered almost successive. For this reason, even if there is a part of combination of the incoming waves which have the phase difference of 180 degrees to completely erase mutually, at the receiving antennas, an effective receiving power of a large number of the remaining incoming waves exists.

On the other hand, the OFDM scheme has resistance to the delayed wave arriving in the guard section in the demodulating process of the receiving side. For this reason, even if the receiving side receives a plurality of incoming waves having time differences in a case where there are a plurality of transmitted wave sources or there is a multipath caused by the reflected wave, deterioration in the transmission quality caused by the intersymbol interference at the demodulating step is small. Therefore, when a number of incoming waves whose phases are successively different are received, normal demodulation can be executed if the maximum time difference of the incoming waves contributing the main power is within the guard section.

Thus, as the leaky coaxial cable 12 is employed as the antenna of the wireless base station unit 13, the radio wave propagation paths between the leaky coaxial cable 12 and the wireless terminal units 17 scattered in the indoor space 11 can be certainly secured even if a number of units of furniture and fixtures exist in the indoor space 11. In addition, as the OFDM scheme is applied to the modulation and demodulation of the wireless base station unit 13 and the wireless terminal units 17, influence of the intersymbol interference caused by the time difference of the incoming waves that arrive from a number of radio wave propagation paths can be removed. Moreover, a number of wireless base station units do not need to be arranged in the indoor space 11 and the installation costs are restricted. Therefore, generation of the blind areas in the indoor space 11 can be prevented. Furthermore, the high-speed broadcast transmission including no intersymbol interference can be implemented at low costs.

The leaky coaxial cable 12 is arranged to meander on the ceiling of the indoor space 11. For this reason, even if the leaky coaxial cable 12 does not exist immediately above the wireless terminal unit 17, two parts of the leaky coaxial cable 12 pass at a comparatively short distance from the wireless terminal unit 17. Therefore, a number of slots 12b exist at a comparatively short distance from the wireless terminal unit 17 and the wireless terminal unit 17 can ensure a preferable wireless propagation path with the leaky coaxial cable 12.

Figure 6:
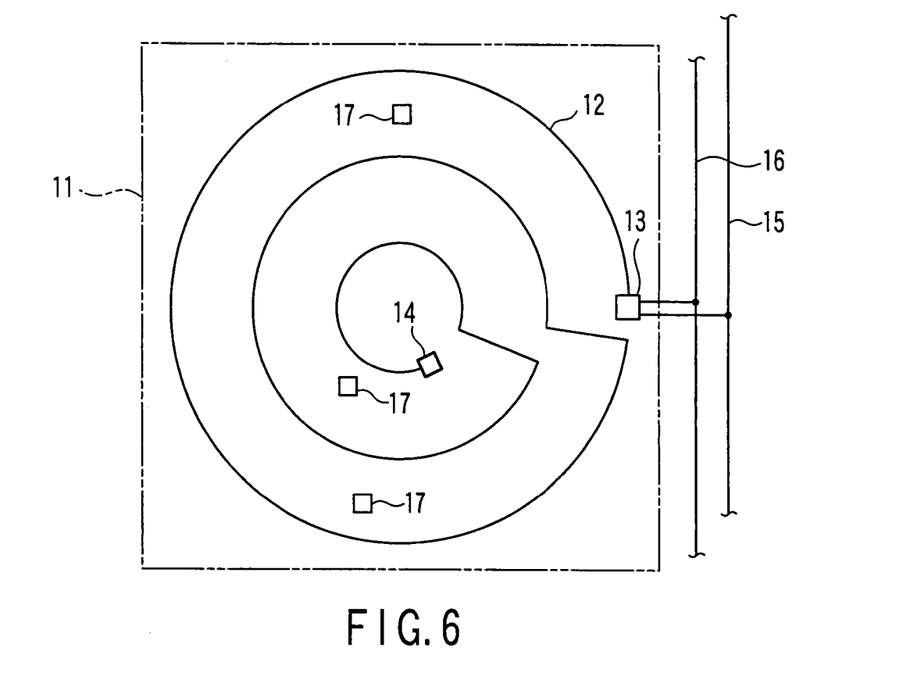
FIG. 6 is an illustration showing another example of the arrangement of the leaky coaxial cable according to the first embodiment.
Figure 7:
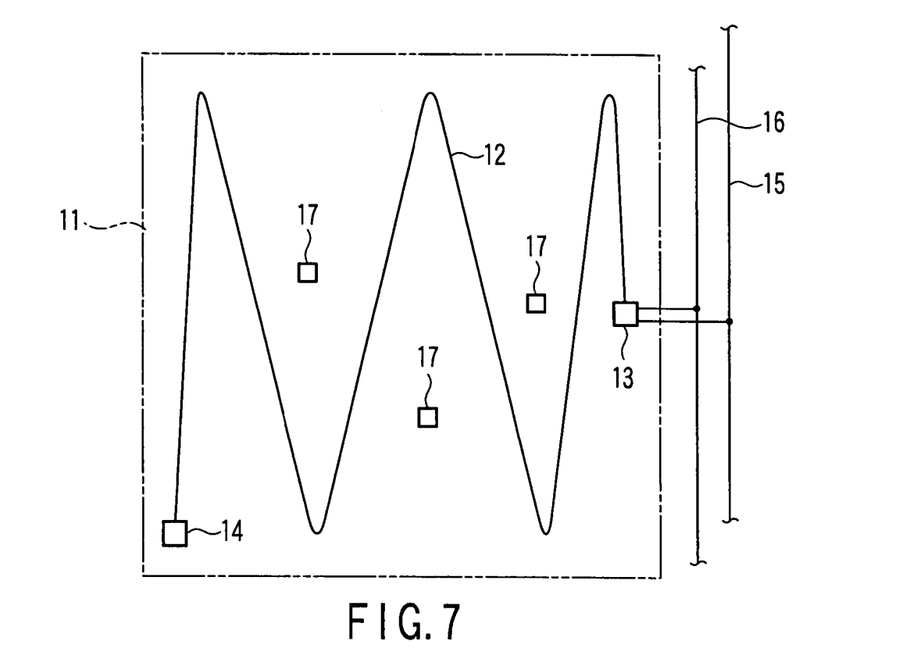
FIG. 7 is an illustration showing the other example of the arrangement of the leaky coaxial cable according to the first embodiment.

The leaky coaxial cable is arranged here to meander on the ceiling of the indoor space 11, but the arrangement is not limited to this. For example, the leaky coaxial cable 12 may be arranged spirally as shown in FIG. 6 or arranged zigzag as shown in FIG. 7, on the ceiling of the indoor space 11. Otherwise, the leaky coaxial cable 12 may be arranged under the floor of the indoor space 11.

SECOND EMBODIMENT

Elements like or similar to those disclosed in the above embodiment are denoted by similar reference numbers and are not described in detail here.

Figure 8:
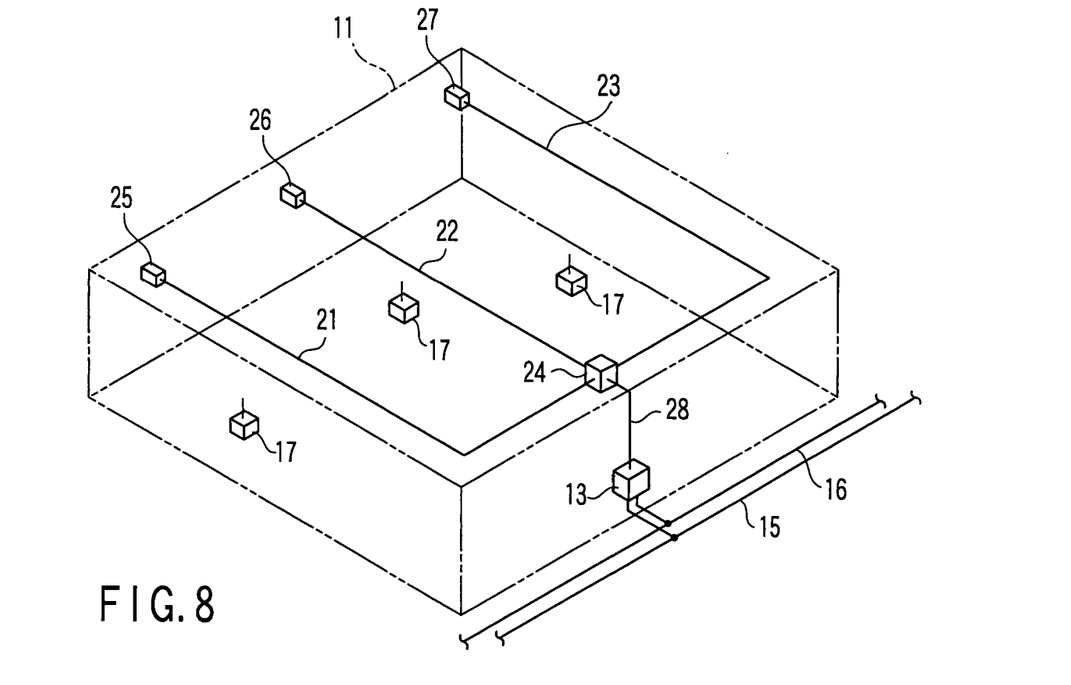
FIG. 8 is a perspective view showing arrangement of units according to a second embodiment of the present invention.

As shown in FIG. 8, for example, three leaky coaxial cables 21, 22 and 23 are arranged in parallel with a predetermined interval, as leaky transmission paths, on a ceiling of an indoor space 11 where a wireless LAN is to be worked.

The leaky coaxial cables 21, 22 and 23 have the structure shown in FIGS. 2A and 2B, similarly to the leaky coaxial cable 12. In a wireless LAN system of a 2.4 GHz band or a 5 GHz band having the transmission power of tens to hundreds of mW, the interval of the leaky coaxial cables 21, 22 and 23 should rationally be set at approximately 6 to 10 m, in view of compatibility between the communication performance and the economics.

One-side ends of the leaky coaxial cables 21, 22 and 23 are connected to a power synthesizer-distributor 24 and the other side ends thereof are connected respectively to terminators 25, 26 and 27 serving as termination loads having a load resistance value equivalent to the characteristic impedance of a coaxial cable. A common terminal of the power synthesizer-distributor 24 and a wireless base station unit 13 are connected by a coaxial cable 28.

Even in this structure, the leaky coaxial cables 21, 22 and 23 function as antennas of the wireless base station unit 13. Even if a number of units of the furniture and fixtures exist in the indoor space 11, radio wave propagation paths between the leaky coaxial cables 21, 22 and 23 and the wireless terminal units 17 scattered in the indoor space 11 can be certainly secured. In addition, as the OFDM scheme is applied to the modulation and demodulation of the wireless base station unit 13 and the wireless terminal units 17, influence of the intersymbol interference caused by the time difference of the incoming waves that arrive from a number of radio wave propagation paths can be removed. Moreover, a number of wireless base station units do not need to be arranged in the indoor space 11 and the installation costs are restricted. In this embodiment, too, the same advantage as that of the above-described embodiment can be therefore obtained.

THIRD EMBODIMENT

Elements like or similar to those disclosed in the above embodiments are denoted by similar reference numbers and are not described in detail here.

For example, in an indoor space of a shop or a store, a number of elongated showcases 31 are arranged in parallel.

Figure 9:
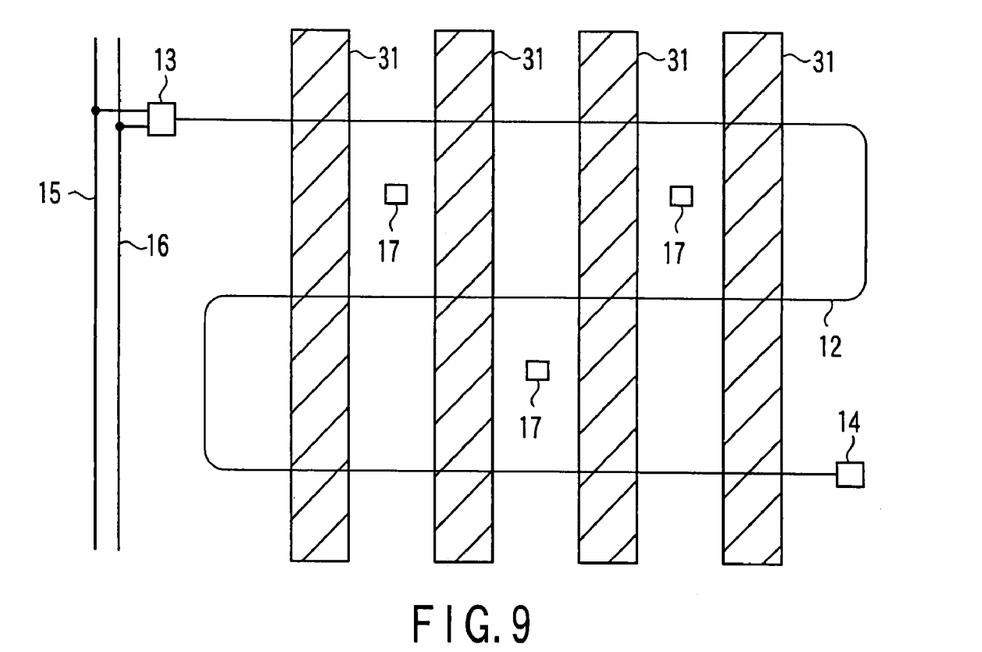
FIG. 9 is an illustration showing an example of a relationship between arrangement of showcases and a meandering arrangement of a leaky coaxial cable according to a third embodiment of the present invention.

If a leaky coaxial cable 12 is arranged to meander on a ceiling of the indoor space, similarly to the first embodiment, the leaky coaxial cable 12 crosses front and rear parts of each of the showcases as shown in FIG. 9.

Figure 10:
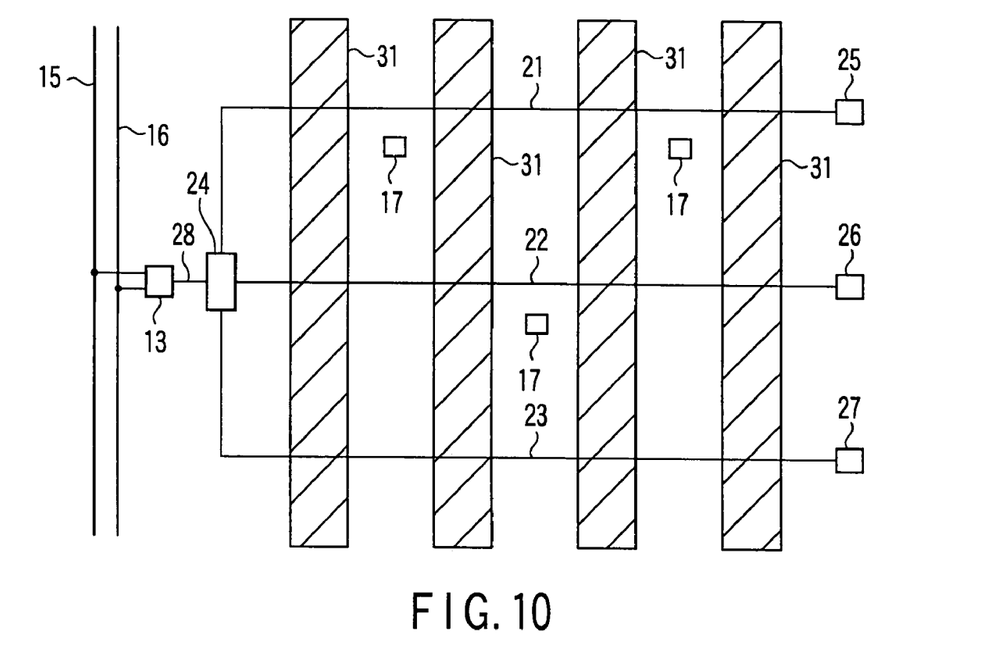
FIG. 10 is an illustration showing another example of the relationship between the arrangements of the showcases and the leaky coaxial cable according to the third embodiment.

In addition, if a plurality of leaky coaxial cables 21, 22 and 23 are arranged to be spaced from each other with a predetermined interval on the ceiling of the indoor space, similarly to the second embodiment, the leaky coaxial cables 21, 22 and 23 cross front and rear parts of each of the showcases as shown in FIG. 10.

Thus, by arranging the leaky coaxial cables such that they cross the front and rear parts of the showcases 31 as described above, the leaky coaxial cables can be seen at any time from wireless terminal unit 17 even if the wireless terminal unit 17 is arranged in a passage between the showcases 31. Therefore, the wireless terminal unit 17 can certainly make transmission and reception with the wireless base station unit 13 via the leaky coaxial cable without being disturbed by the showcases 31. In addition, there are a plurality of units of leaky coaxial cables that can be seen from the wireless terminal unit 17. Even if one of them is temporarily blocked by a person, the propagation paths with the leaky coaxial cables can be ensured and normal communication can be therefore made.

For this reason, the wireless LAN system shown in FIGS. 9 and 10 can remove the blind areas hidden behind the showcases and crowded persons and ensure the stability of the communication quality by the uniform radio wave radiation and receiving characteristics of the leaky coaxial cables, even in an environment of a retail shop or store where a number of showcases are arranged and a number of customers come in and go out.

FOURTH EMBODIMENT

This embodiment employs an antenna array cable 31 shown in FIG. 11 as a transmission path which functions as an antenna. In the antenna array cable 31, first antenna units 33 are arranged with an interval of, for example, 50 cm to 1 m in the middle of a high frequency cable 32, and not a terminator but a second antenna unit 34 is arranged at one end of the antenna array cable 31.

Figure 12A:
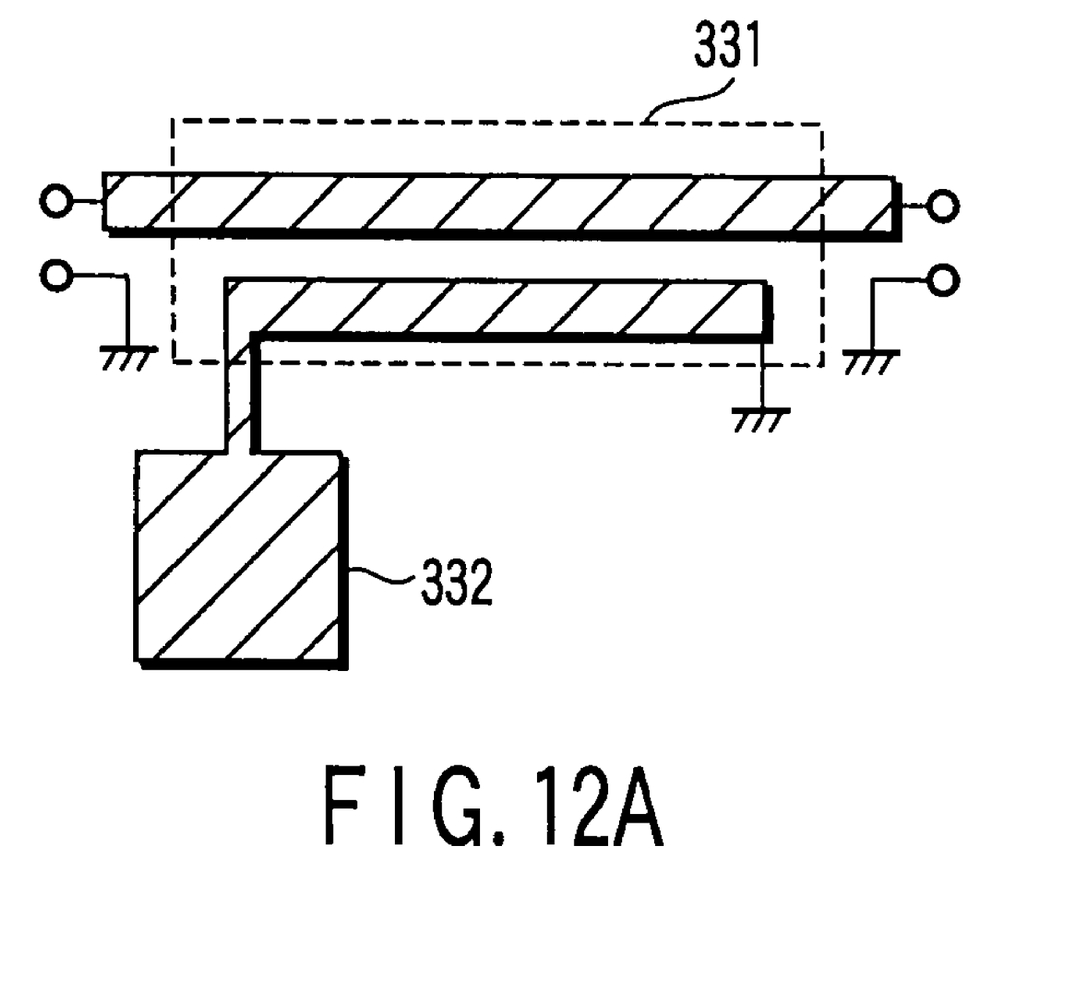
FIG. 12A is an illustration showing a structure of a first antenna portion of the antenna array cable according to the fourth embodiment.

In the first antenna unit 33, as shown in FIG. 12A, a high frequency coupler 331 and an antenna element 332 are formed in pattern on a printed board. The antenna element 332 is a planar patch antenna. Connection between the first antenna units 33 and the high frequency cable 32 is made through, for example, connectors.

In the second antenna unit 34, a high frequency coupler is not included, but only an antenna element 341 is formed as a pattern on a printed board, as shown in FIG. 12B. The antenna element 341 is also a planar patch antenna. Connection between the second antenna unit 34 and the high frequency cable 32 is also made through a connector.

If the antenna array cable 31 thus formed is mounted on the ceiling, the radio wave radiation characteristics of the antenna array cable 31 have a band-shaped radiation pattern as shown in FIGS. 13A and 13B, similarly to the above-described leaky coaxial cable, unlike a general single-type antenna such as a whip antenna and a dipole antenna.

Similarly to the leaky coaxial cable, the antenna array cable 31 is arranged on, for example, a surface side or a back side of the ceiling panels, the ceiling of the ceiling panels, or the like. If there are no ceiling panels, the antenna array cable 31 is hung inside a roof and is arranged in an upper space portion of the indoor space.

The antenna array cable 31 is arranged to meander as shown in FIG. 1, arranged spirally as shown in FIG. 6 or arranged zigzag as shown in FIG. 7, on the ceiling. In addition, a plurality of antenna array cables 31 are arranged in parallel with a predetermined interval by using a power synthesizer-distributor as shown in FIG. 8.

Furthermore, if a plurality of showcases are arranged in parallel, the antenna array cable 31 is arranged to cross the front and rear parts of the showcases as shown in FIGS. 9 and 10.

Thus, even if the antenna array cable 31 is used instead of the leaky coaxial cable, the same advantage as that of each of the above-described embodiments can be obtained.

In the embodiments, the leaky transmission path and the antenna array cable are used as the transmission path which functions as the antenna. However, the transmission path is not limited to this.

In addition, application of the present invention to the wireless LAN system has been described in the embodiments. However, the present invention is not limited to this. The present invention can also be applied to a wireless communication system to which the LAN is not applied.

According to the present invention, a wireless communication system which can prevent generation of the indoor blind areas, and which can implement high-speed broadcast transmission causing no intersymbol interference at small costs, can be obtained.

What is claimed is:

1. A leaky transmission path serving as an antenna for a wireless communication base station that makes wireless communication with a wireless terminal unit in an orthogonal frequency division multiplex scheme, comprising:
   a wave guide path; and
   a plurality of slots arranged on the wave guide path such that when a plurality of incoming waves from the plurality of slots are received by the wireless terminal unit, a time difference on the plurality of incoming wave occupying a main power, of the plurality of incoming waves, is in a guard section of the orthogonal frequency division multiplex scheme.

2. The leaky transmission path according to claim 1, wherein said wave guide path includes first and second portions located close to the wireless terminal unit and a folded portion connected in series between the first and second portions, and the incoming waves occupying the main power are obtained from the slots on the first portion and the slots on the second portions.

3. The leaky transmission path according to claim 1, wherein said wave guide path is arranged to meander or arranged zigzag.

4. The leaky transmission path according to claim 1, wherein said wave guide path is arranged to cross front and rear parts of a plurality of showcases.

* * * * *